US008103740B1

(12) United States Patent
Abramov et al.

(10) Patent No.: US 8,103,740 B1
(45) Date of Patent: Jan. 24, 2012

(54) CROSS-DOMAIN LINKING OF DATA TYPES

(75) Inventors: Dmitri Abramov, Liberty Grove (AU); Michael Greystock Jones, Lane Cove North (AU); Benjamin Charles Appleton, Summer Hill (AU)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 12/465,524

(22) Filed: May 13, 2009

(51) Int. Cl.
*G06F 3/00* (2006.01)
(52) U.S. Cl. .................... 709/217; 719/328; 719/329
(58) Field of Classification Search .................. 709/203, 709/217; 719/328, 329
See application file for complete search history.

(56) References Cited

U.S. PATENT DOCUMENTS

| 7,426,699 | B2 * | 9/2008 | Schneider ............... | 715/804 |
|---|---|---|---|---|
| 7,809,785 | B2 * | 10/2010 | Appleton et al. .......... | 709/201 |
| 7,979,807 | B2 * | 7/2011 | Subramaniam ............ | 715/804 |
| 2007/0282951 | A1 * | 12/2007 | Selimis et al. ............ | 709/205 |
| 2007/0299857 | A1 * | 12/2007 | Gwozdz et al. ........... | 707/102 |
| 2009/0271690 | A1 * | 10/2009 | Iglesias .................... | 715/200 |
| 2009/0328063 | A1 * | 12/2009 | Corvera et al. ........... | 719/315 |

OTHER PUBLICATIONS

Macromedia Generator 2 Developer Edition "Using Generator" (Feb. 2001) pp. 1-132.
Ted on Flash: Google Maps Flash API—Distributed components/services [online] [retrieved on Jul. 25, 2011]. Retrieved from the Internet: http://ted.onflash.org/2008/05/google-maps-flash-api-distributed.php (May 19, 2008) pp. 1-5.
Chung, et al. "DCOM and CORBA Side by Side, Step by Step, and Layer by Layer" (Sep. 3, 1997) [online] [retrieved on Jul. 25, 2011] Retrieved from the Internet: http://research.microsoft.com/en-su/um/people/ymwang/papers/html/dcomncorba/s.html pp. 1-14.
Programming ActionScript 3.0 for Flash Object-oriented programming in ActionScript [online] [retrieved on Aug. 26, 2011] Retrieved from the Internet: http://help.adobe.com/en_US/ActionScript/3.0_ProgrammingAS3/WS5b3ccc516d4fbf351e63e3d118a9b90204-7f41html 4 pages.

* cited by examiner

*Primary Examiner* — Kevin Bates
(74) *Attorney, Agent, or Firm* — Fish & Richardson P.C.

(57) ABSTRACT

In one implementation, a computer-implemented method can include receiving, at a first server corresponding to a first domain, a request from a client computer for a vector graphics file that includes instructions that implement a first method. The method can further include sending the vector graphics file to the client computer, the client computer having received a library file from a second server corresponding to a second domain, wherein the library file includes instructions that implement a second method to direct calls to the first method, and wherein executing the vector graphics file and the library file causes the client computer to perform operations. The operations performed by the client computer can include establishing a link between the first method and the second method and directing a call made to the second method with an argument associated with a data type, to the first method using the established link.

20 Claims, 9 Drawing Sheets

CROSS-DOMAIN LINKING OF DATA TYPES

TECHNICAL FIELD

This document generally describes methods, systems, and products for enabling data types to be shared between files that are associated with different internet domains.

BACKGROUND

The Internet provides a mechanism by which a server can provide a client with a file to be executed by an application running on the client. A client can use a variety of applications to execute a variety of electronic file formats provided by a server. For example, ADOBE's FLASH PLAYER application ("FLASH application") executes and displays SHOCKWAVE FLASH files ("FLASH files" or "FLASH executables").

Generally, the FLASH application running on a client does not permit a FLASH file from a first domain (e.g., www.first-domain.com) to share data types with a FLASH file from a second domain (e.g., www.second-domain.com). This security restriction may be referred to as a "domain boundary." The FLASH file from the first domain may grant the FLASH file from the second domain scripting rights, which permits the FLASH file from the second domain to execute methods and access objects associated with the FLASH file from the first domain. When scripting rights are granted, the FLASH application restricts data (e.g., objects) accessed across the domain boundary as generic data (e.g., data accessed and/or passed without a specified data type).

SUMMARY

This document generally describes methods, systems, and products for sharing data types across a domain boundary.

In one implementation, a computer-implemented method can include receiving, at a first server corresponding to a first domain, a request from a client computer for a vector graphics file that includes instructions that implement a first method that is associated with a first unique identifier. The method can further include sending the vector graphics file to the client computer, the client computer having received a library file from a second server corresponding to a second domain, wherein the library file includes instructions that implement a second method to direct calls to the first method, wherein the second method is associated with a second unique identifier, and wherein executing the vector graphics file and the library file causes the client computer to perform operations. The operations performed by the client computer can include associating the first method with the first domain and the second method with the second domain so that the first method is restricted to receiving an argument from the second method as data without an associated data type; establishing a link between the first method and the second method using the first unique identifier and the second unique identifier; directing a call made to the second method with an argument associated with a data type, to the first method using the established link and passing the argument by reference, wherein the argument is received by the first method without the associated data type; and processing the directed call with the argument that was passed by reference using the first method.

In another implementation, a computer-implemented method can include receiving at a first server corresponding to a first domain a request from a client computer for a vector graphics file that includes instructions that implement a first method that is associated with a first unique identifier. The method can further include sending the vector graphics file to the client computer, the client computer having received a library file from a second server corresponding to a second domain, wherein the library file includes instructions that implement a second method to direct calls to the first method, wherein the library file further includes a third method that inherits the first method and has instructions modification at least a portion of the first method, wherein the second method is associated with a second unique identifier, and wherein executing the vector graphics file and the library file causes the client computer to perform operations. The operations performed by the client computer can include associating the first method with the first domain and the second method with the second domain so that the first method is restricted to receiving an argument from the second method as data without an associated data type; establishing a first link between the first method and the second method using the first unique identifier and the second unique identifier; defining a fourth method to correspond to the third method, wherein the defined fourth method has instructions to direct calls to the third method and is associated with the first domain, and wherein the third method is associated with the second domain such that the third method is restricted to receiving an argument from the fourth method as data without an associated data type; and establishing a second link between the fourth method and the third method.

In another implementation, a computer-implemented method can include receiving at a client computer a vector graphics file from a third-party server and receiving at the client computer a library file from a library server corresponding to a first internet domain, wherein the library file includes instructions that implement a first method that is associated with a first identifier, wherein the third-party server corresponds to a second internet domain, wherein the vector graphics file includes instructions that implement a second method to direct calls to the first method, and wherein the second method is associated with a second identifier. The method can further include associating the first method with the first domain and the second method with the second domain so that the first method is restricted to receiving an argument from the second method as data that does not have an associated data type. The method can additionally include establishing a link between the first method and the second method using the first identifier and the second identifier and directing a call made to the second method with an argument associated with a data type, to the first method using the established link and passing the argument by reference, wherein the argument is received by the first method without the associated data type. The method can also include processing the redirected call with the argument that was passed by reference using the first method, wherein the first method is configured to treat the received argument as the associated data type.

In another implementation, a system for performing cross-domain linking of data types can include one or more servers corresponding to a first internet domain and means for creating a library file that includes instructions that implement a first method that is associated with a first unique identifier and a development library file that includes instructions that implement a second method to direct calls to the first method, wherein the first method is associated with a second unique identifier. The system can further include an interface to the one or more servers configured to receive a first request from a third-party server for the development library file to be compiled into a vector graphics file and configured to receive a second request from the client computer for a library file to be used by an application executed by the client computer.

The system can additionally include a communication module to transmit the development library file to the third-party server and to transmit the library file to the client computer, wherein the client computer is adapted to receive the compiled vector graphics file containing the development library file from the third-party server, and to establish a link between the first method and the second method so that a call with an argument made to the second method is directed to the first method with the argument being passed by reference when the vector graphics file and the library file are executed by the application on the client computer.

Advantageously, the described methods, systems, and products may provide one or more benefits in certain implementations. For example, syntax errors generated at run-time by passing and/or referencing typed data across a domain boundary can be reduced. Instead of receiving syntax errors at run-time due to type mismatches, errors can be caught by performing compile-time type checking. The described methods, systems, and products can also enable better data type compatibility across a domain boundary that restricts cross-domain data type sharing. Moreover, convenient communication techniques can be made available to programmers, thereby improving the quality and type of programs they develop.

An additional advantage can include a library server having the ability to update the library that is used by third-party files without needing the participation of third-parties that create these files. For instance, if the library server updates the implementation library used by third-party files, the third-party files will receive and use the updated implementation library when being executed. By contrast, were the implementation library to be compiled into third-party files, use of an updated implementation library could depend on whether the third-parties had recompiled their third-party files with the updated library. The described methods, systems, and products permit for the updated implementation library to be used by third-party files without recompilation.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
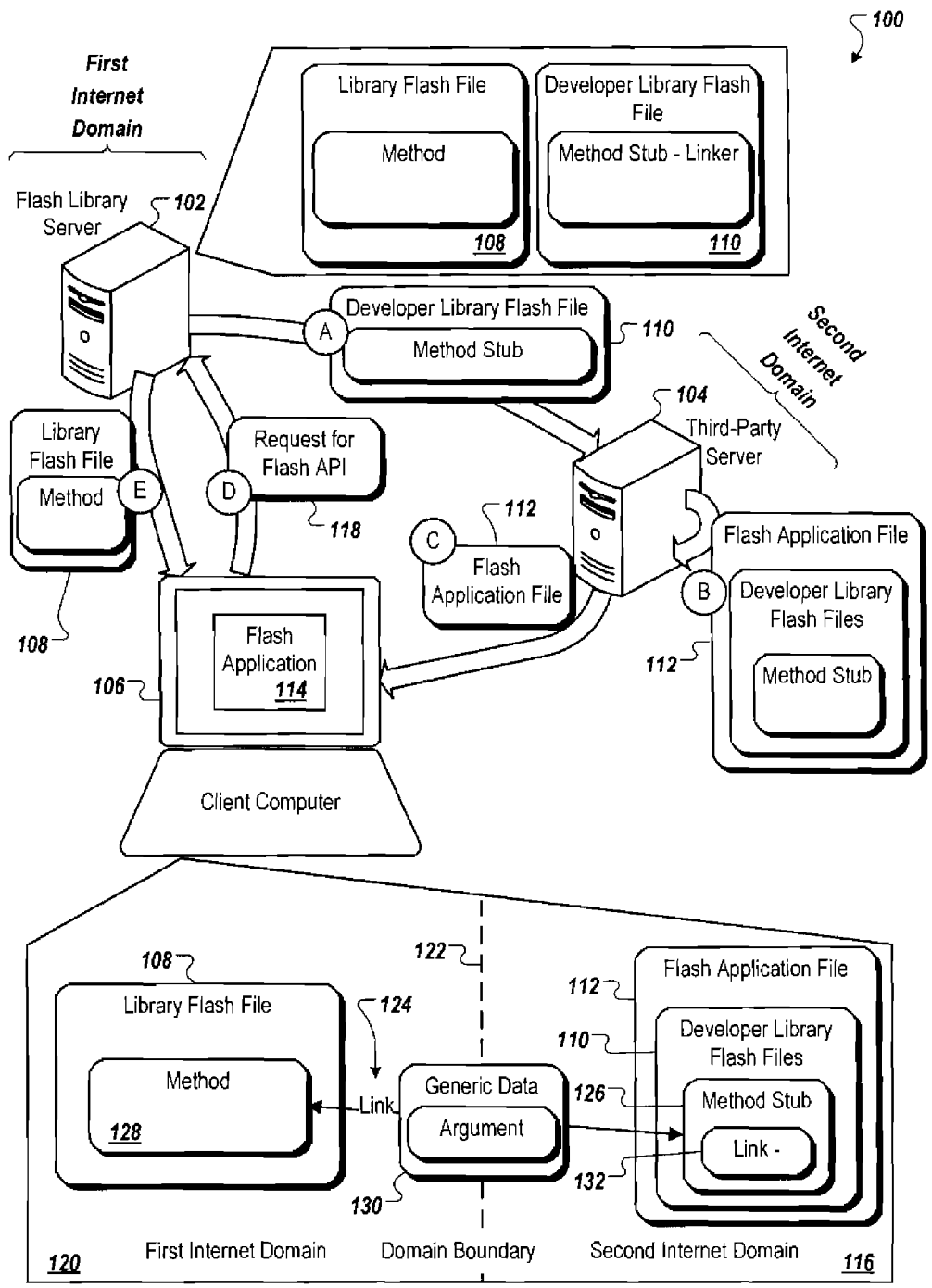
FIG. 1 is a diagram of an example system for performing cross-domain linking of data types in a FLASH application.

This document generally describes methods, systems, and products for allowing data types to be shared between independent processing environments within an application. An application might use independent processing environments as a security measure to execute files originating from different internet domains. The idea is that, since these files are from different servers, their interaction should be highly restricted. As such, the executables run in different, independent processing environments and are not permitted to share data types that are defined locally to the processing environment (e.g., an object data type that is defined by one of the files).

However, these security restrictions imposed by an application can hamper the use of libraries. When a library is retrieved from a different internet domain than the file that is requesting its use, the file requesting the library can be restricted from accessing and using the data types that the library defines.

This document generally describes methods, systems, and products for sharing data types between separate processing environments by creating a development library to be compiled into files seeking to access a library from another domain. The development library can include the same data type definitions as the implementation library, but the development library can contain stub methods, objects, events, etc. instead of fully implemented methods, objects, events, etc. For instance, an application programming interface (API) can be implemented by objects. For each object implementing the API, there can be a stub object that corresponds and refers to the implementation object.

Stubs can serve at least two purposes. First, they can be used to represent the data types contained in the library within the application file's processing environment. Second, the stubs can be used to "spoof" objects implemented in the library within the application file's processing environment. Stubs can implement the same set of API interfaces as the objects that they "spoof". However, stubs and their original objects (e.g., the objects they "spoof") exist in different processing environments. A stub is a representation that can be used to access the original object from the stub's processing environment. A method call made by the third-party application to a stub can be redirected by the stub to the object across the domain boundary to the corresponding original object that implements an API interface. If a method of a stub object accepts an argument that needs to be passed across the domain boundary to a corresponding original object, the stub can either clone the argument or create/retrieve a stub object that will represent the argument within the processing environment of the corresponding original object.

The methods, systems, and products generally described in this document are illustrated using a FLASH file format and a FLASH application that can restrict FLASH files from different domains to independent processing environments. FLASH files may also be referred to as SWF (short for "SHOCKWAVE FLASH") files or FLASH executables. Additionally, scripting language files that can be used to create vector graphic files may be referenced (such scripting language files may be compiled into vector graphic files). An example scripting language file used to generate a FLASH file can be referred to as an ACTIONSCRIPT. FLASH files, SWF files, and ACTIONSCRIPT files can be formatted in a variety of ways, for example, as provided in the "SWF File Format Specification Version 10," published by ADOBE Systems Inc., 345 Park Avenue, San Jose, Calif. 95110-2704. Other similar files and processes may be addressed by other systems such as MICROSOFT SILVERLIGHT.

FIG. 1 is a diagram of an example system 100 for performing cross-domain linking of data types in a FLASH application. The system 100 can include a library server 102, a third-party server 104, and a client computer 106.

In the example system 100, the library server 102 is associated with a first internet domain (e.g., www.firstdomain.com) and the third-party server 104 is associated with a second internet domain (e.g., www.seconddomain.com). The client computer 106 can receive a FLASH file (or FLASH executable) from the library server 102 and a FLASH file (or FLASH executable) from the third-party server 104. Using a single application (e.g., a FLASH application) to execute both of the received FLASH files, the client computer 106 can impose a security restriction upon interactions between the received FLASH FILES. More specifically, since these two FLASH files are received by the client computer 106 from different domains, the application can restrict data type sharing, (e.g., instantiation of a data type, extension of a data type) across a domain boundary (a security restriction imposed because the FLASH files are associated with different internet domains) separating the two FLASH files.

For example, the client computer 106 can receive a FLASH file from the third-party server 104, where the file contains instructions to execute a program and display the results to the user (e.g., a game program, a map program, a video program, etc.). To properly render the program, the client computer 106 can receive a FLASH file from the library server 102 that is a library that implements a set of data types (e.g., objects, classes, etc.) and methods defined by an API. When executed, the program FLASH file from the third-party server 104 may attempt to instantiate an object of a data type defined in the library FLASH file. However, the program FLASH file cannot instantiate such a typed object in this circumstance because data types are not shared across the domain boundary (e.g., when instantiating a typed data object defined in the library FLASH executable, the program FLASH executable can instead invoke a generic, untyped object).

To enable data types to be shared across the domain boundary, the library server 102 can create a library FLASH file 108 and a development library FLASH file 110. The library FLASH file 108 can define a variety of resources, including data types (e.g., classes, objects, etc.), methods that operate on the defined data types (e.g., methods that take defined data types as arguments, methods defined as part of a class, etc.), events and event handlers related to the data types, etc. The definitions within the library FLASH file 108 can be fully implemented—meaning a definition (e.g., a method, a class, etc.) has sufficient instructions to implement its intended objective (e.g., a method to display a styled dialog box can have instructions that, when executed, display the styled dialog box).

The development library FLASH file 110 can define all of the same data types, methods, events and event handlers as the library FLASH file 108. However, the definitions within the development library FLASH file 110 can be stubs (e.g., shells, wrappers, etc.) that are designed to link to or clone an implemented counterpart definition within the library FLASH file 108 at run-time.

For instance, a method A that takes an argument of data type B can be defined and implemented in the library FLASH file 108. A counterpart to method A can be defined in the development library FLASH file 110 with the same name (method "A") and with the same number and type of arguments (a single argument of data type "B"). However, the method A defined in the development library FLASH file 110 can be a stub method that contains instructions to redirect calls (e.g., calls made to the stub method A) to the fully-implemented method A defined in the library FLASH file 108. Thus, when a call is made to the stub method A with an argument of data type B, the stub redirects that call to the implementation method A. The stub also converts the argument of type B that is passed to the implementation method A to type B defined within the implementation library before invoking the implementation method A.

After the library server 102 has generated the library flash file 108 and its corresponding development library FLASH file 110, the third-party server 104 can request and receive the development library FLASH file 110 from the library server 102 (as depicted by step A). The library FLASH file 108 and the development library FLASH file 110 can be derived from ACTIONSCRIPT files that can be compiled into FLASH files. In some implementations, in response to a request from the third-party server 104, the library server 102 can send the third-party server 104 an ACTIONSCRIPT file that represents the development library FLASH file 110.

The third-party server 104 can compile the development library FLASH file 110 (or a received ACTIONSCRIPT file) into a FLASH application file 112 (as depicted by step B). The FLASH application file 112 can include instructions that invoke the data types, methods, events, etc., defined in the development library FLASH file 110. With run-time linking (described in detail below), the stubs defined in the development library FLASH file 110 (and local to the FLASH application file 112) can correspond to full implementations in the library FLASH file 108. Through such links and/or clones, the FLASH application file 112 can use the fully-implemented data types, methods, events, etc. as defined in the library FLASH file 108 when making local calls to the development library FLASH file 110.

For example, the FLASH application file 112 can be any of a variety of interactive programs, such as a game (e.g., a single-player game, a multi-player online game), a mapping application (e.g., display map of a location, determine and display map with driving directions), a streaming content application (e.g., audio, video, stock quotes), a transaction enabling application (e.g., an online store, an application for filling-out and submitting forms online), etc. The library FLASH file 108 can be used by the third-party server 104 and/or other third-party servers for a standard set of functionality (e.g., methods, events) and data types that enable the operation of such applications (e.g., the FLASH application file 112).

By compiling the FLASH application file 112 with the development library FLASH file 110, an application (e.g., a third-party developer application) running on the third-party server 104 (or some other machine prior to the FLASH application file 112 being loaded onto the third-party server 104) is able to identify and resolve potential syntax errors before deploying the FLASH application file 112 on the third-party server 104. Once deployed (e.g., hosted for client computers to access) on the third-party server 104, the FLASH application file can be sent to the client computer 106. Because the development library FLASH file 110 defines the same data types, methods, events, etc. as the library FLASH file 108, any syntax errors (e.g., incorrect number of arguments in a method call, wrong data type for an argument, etc.) that may exist can be identified before execution of the FLASH application file 112. For instance, if the FLASH application file 112 is not compiled with the development library FLASH file 110, and it makes an improperly typed call to a method defined in the library FLASH file 108, the syntax error may not be identified until run-time (e.g., when the call to the method is made) because the two files are not compiled together.

Referring again to the operation of the system 100, the third-party server 104 sends a compiled FLASH application file 112 to the client computer 106 (as depicted at step C) to be executed by a FLASH application 114. After receiving the compiled FLASH application file 112, the FLASH application 114 can begin executing the compiled FLASH application file 112 in an independent environment 116 (e.g., a sandbox) that is associated with the second internet domain. The compiled FLASH application file 112 can include instructions (via the development library FLASH file 110) that identify the library FLASH file 108 as being needed for the FLASH application file 112 to function properly. The FLASH application file 112 (or the development library FLASH file 110) can instruct the FLASH application 114 and/or the client computer 106 to obtain the library FLASH file 108 from the library server 102.

The client computer 106 can send a request 118 for the library FLASH file 108 to the library server 102 (as depicted at step D). The library server 102 can then retrieve the library FLASH file 108 and send it to the client computer 106 (as depicted by step E). Having received the library FLASH file 108, the FLASH application 114 can begin to execute the library FLASH file 108 within an independent environment 120 (e.g., a sandbox) associated with the first internet domain. Since the FLASH application 114 executes the FLASH application file 112 and the library FLASH file 108 in different independent environments 116 and 120, respectively, the FLASH application file 112 and the library FLASH file 108 may not be able to share data types, instantiated objects, events, etc., under normal conditions.

The FLASH application file 112 and the library FLASH file 108 can be termed to be separated by a domain boundary 122 within the FLASH application 114. The FLASH application 114 can permit the FLASH application file 112 and the library FLASH file 108 to make method calls across the domain boundary 122. However, the FLASH application 114 can restrict data passed across the domain boundary 122 as generic (e.g., untyped) data.

For illustrative purposes, assume a call to a method A originates from the independent environment 116 associated with the first internet domain, which has a stub 126 of method A. The call to the stub 126 results in the invocation of a method 128 (from the library file 108), which is executed within the independent environment 120 associated with the second internet domain. Because the definition for the stub 126 exists at the moment of compilation of application 128, errors in the name of the method or the type of its parameters will be found during the compilation of the application 112. If the method A accepts an argument of type B, the stub 126 can check that the argument is converted to type B defined within domain 120 before method 128 is invoked (unless argument B has the data type defined by Flash library). The stub 126 may have to take care of creating the object of the type B that can be accepted by method 128 before invoking that method.

In some implementations, the FLASH application 114 can restrict as generic data only customized data types (e.g., classes defined within the library FLASH file 108) that are defined within one of the independent environments 116 or 120. In such implementations, standard data types defined by the FLASH application 114, such as integers, strings, sprites, etc., can be passed as typed data across the domain boundary 122, whereas all custom data types (defined outside of a FLASH library) are passed as generic untyped data. In other implementations, all data types (including standard data types) can be restricted as generic when they are passed across the domain boundary 122.

Upon execution of the library FLASH file 108, the development library FLASH file 110 compiled into the FLASH application file 112 can be linked to the library FLASH file 108. Linking the two library FLASH files 108 and 110 over the domain boundary 122 can involve linking parts (e.g., objects, methods, events, etc.) of the library FLASH file 108 with corresponding parts of the development library FLASH file 110. For example, a fully-implemented method A in the library FLASH file 108 can be linked to a stub method A in the development library FLASH file 110. In another example, a stub object in the development library FLASH file 110 can be linked to an object in the library FLASH file 108 that implements part of an API. A link can be implemented in a variety of ways, including as a pointer to the corresponding part (e.g., a memory address of the corresponding part), a unique name of the corresponding part, etc.

Links can be used to redirect calls to methods of stubs (e.g., instantiated objects, events, etc.) from the development library FLASH file 110 across the domain boundary 122 to corresponding fully-implemented objects, methods, events, etc. provided by the library FLASH file 108. For instance, as depicted, a link 124 is provided between a method stub 126 in the development library FLASH file 110 (which is depicted as part of the FLASH application file 112) and a corresponding, fully-implemented method 128 in the library FLASH file 108. A call made to the method stub 126 can be redirected to the fully-implemented method 128 using the link 124 (e.g., a pointer to the fully-implemented method).

Additionally, an argument passed to the method stub 126 when it is called can be passed across the domain boundary 122 to the implemented method 128 as generic data 130 using the link 124. Since the implemented method 128 takes the same typed arguments as the method stub 126, the method stub 126 can convert the parameter to the desired type before passing it to the implemented method 128 using the link 124. Conversion of the parameter by the method stub 126 can involve invoking a set of methods of a domain wrapper object within FLASH library file 108. The domain wrapper objects can be created on both sides of the domain boundary. Stub objects can have links to the domain wrappers on both sides to perform object type conversions. Domain wrapper objects within each domain can be responsible for creating a representation (stub or clone) of data types (e.g., objects) coming from another domain within its own domain. For instance, a domain wrapper within FLASH library file 108 may be responsible for creating the representation of the argument that will be passed to a method within domain 120. However, if method 128 returns a result, a domain wrapper within the FLASH application 112 may be responsible for creating the representation of that result accessible within domain 116 by the caller of method A 126.

Arguments can be passed across the domain boundary 130 in a variety of alternative ways. For instance, cloning an argument from an object in one domain to another object in the other domain can be performed field-by-field across the domain boundary 130. In another example, a stub for the argument can be created if the argument is a complex object whose implementation only exists on one side of the domain boundary 130. In a further example, the argument can be passed directly if the argument type is defined within a FLASH standard library. In such an instance, the type definition for the argument will be available on both sides of the domain boundary 130 and object types will be available on both sides.

The argument can be passed from the method stub 126 to the implemented method 128 by-copy (e.g., a copy of the argument is sent to the implemented method 128) or by-reference (e.g., a pointer to the argument's memory address in the independent environment 116 can be passed). If the argument is passed-by-copy, a modification made by the implemented method 128 to the argument (e.g., a variable, an object, etc.) that is passed across the domain boundary 122 will not be reflected on the independent environment 116 associated with the second internet domain (e.g., the argument passed to the stub method 126 will not reflect a change to the value of the argument passed across the domain boundary 122). If the argument is passed-by-reference, a modification made by the implemented method 128 to the argument (e.g., a variable, an object, etc.) passed across the domain boundary 122 will be reflected on the independent environment 116 associated with the second internet domain (e.g., the argument passed to the stub method 126 will reflect a change to the value of the argument passed across the domain boundary 122).

For illustrative purposes, assume the argument passed to the method stub 126 is an integer containing value 10. If the argument is passed-by-copy to the implemented method 128 and the implemented method 128 changes the value of the integer from 10 to 12, when the implemented method 128 finishes, the value of the argument passed to the method stub 126 will still be 10 (e.g., the implemented method 128 will have operated on a copy of the argument passed to the method stub 126, not the argument itself). By contrast, if the argument is passed-by-reference and the implemented method 128 changes the value of the integer from 10 to 12, the value of the argument to the method stub 126 will be 12 when the implemented method 128 finishes its operations.

Linking can be accomplished using instructions contained within the library FLASH file 108 and/or the development library FLASH file 110 (e.g., a domain wrapper objects within each environment 116 and 120 that is responsible for creating a representation (stub or clone) of data types). To establish a link, corresponding portions (e.g., a method, an object, an event, etc.) of the library FLASH file 108 and the development library FLASH file 110 can be identified. For instance, the method stub 126 can be identified as corresponding to the implementation method 128 (e.g., the method 128 is a full-implementation to which the method stub 126 refers). In some implementations, corresponding portions (e.g., objects) are linked together by direct memory references since the FLASH application file 112 and the library FLASH file 108 are being executed in the same address space. In such implementations, methods can be accessible directly through method names on their respective objects. When objects are created by the domain wrappers, described above, domain wrappers can establish links between the original object and its new stub In some implementations, corresponding portions of the FLASH application file 112 and the library FLASH file 108 are identified using unique identifiers associated with each portion to be linked. For instance, the stub method 126 can be associated with a first unique identifier that is paired with a second unique identifier that is associated with the implemented method 128. The unique identifiers can be unique with respect to each of the independent environments 116 and 120 (e.g., a unique identifier A can occur within each independent environment 116 and 120). Alternatively, the unique identifiers can be unique across all of the independent environments 116 and 120 (e.g., the unique identifier A can occur once across both independent environments 116 and 120). The unique identifiers can be implemented in a variety of ways, such as using a unique naming convention for portions of the FLASH files 108 and 110 (e.g., the stub method 126 can be uniquely named stub_method_A and the implemented method 128 can be uniquely named implementation-_method_A).

In addition (or as an alternative) to linking, portions of the library FLASH file 108 can be cloned across the domain boundary 122 to be used in place of the stubs that are defined in the development library FLASH file 110. Through cloning, portions (e.g., objects, methods, events, etc.) of the library FLASH file 108 can be cloned (e.g., copied) from the independent environment 120 that is associated with the first internet domain into the independent environment 116 that is associated with the second internet domain. Cloned portions of the library FLASH file 108 can replace or be linked to by the stubs within the development library FLASH file 110. For example, an implementation object that is instantiated by the library FLASH file 108 can be cloned across the domain boundary 122 and used in place of a stub object by the FLASH application file 112.

Cloning can be performed when portions (e.g., objects, methods, events, etc.) of the library FLASH file 108 are instantiated within the independent environment 120 that is associated with the first internet domain. For instance, an object A that is instantiated when the library FLASH file 108 is initially executed by the FLASH application 114 can be cloned before an object B that is not instantiated until a later time (e.g., the object B can be instantiated in response to a method call made across the domain boundary 122 by the FLASH application file 112).

In some implementations, cloning and linking can be used together to provide for usage of data types across the domain boundary 122. For instance, cloning can be employed for smaller portions (e.g., an object containing a few variables limited to a small size and a few methods) of the library FLASH file 108 and linking can be used for larger portions (e.g., an object containing many variables and many methods). In another example, cloning can be employed when an implementation is trivial enough to be placed on both sides of the domain boundary 122, and linking can be used if an implementation is available within only one side of the domain boundary 122.

Figure 2:
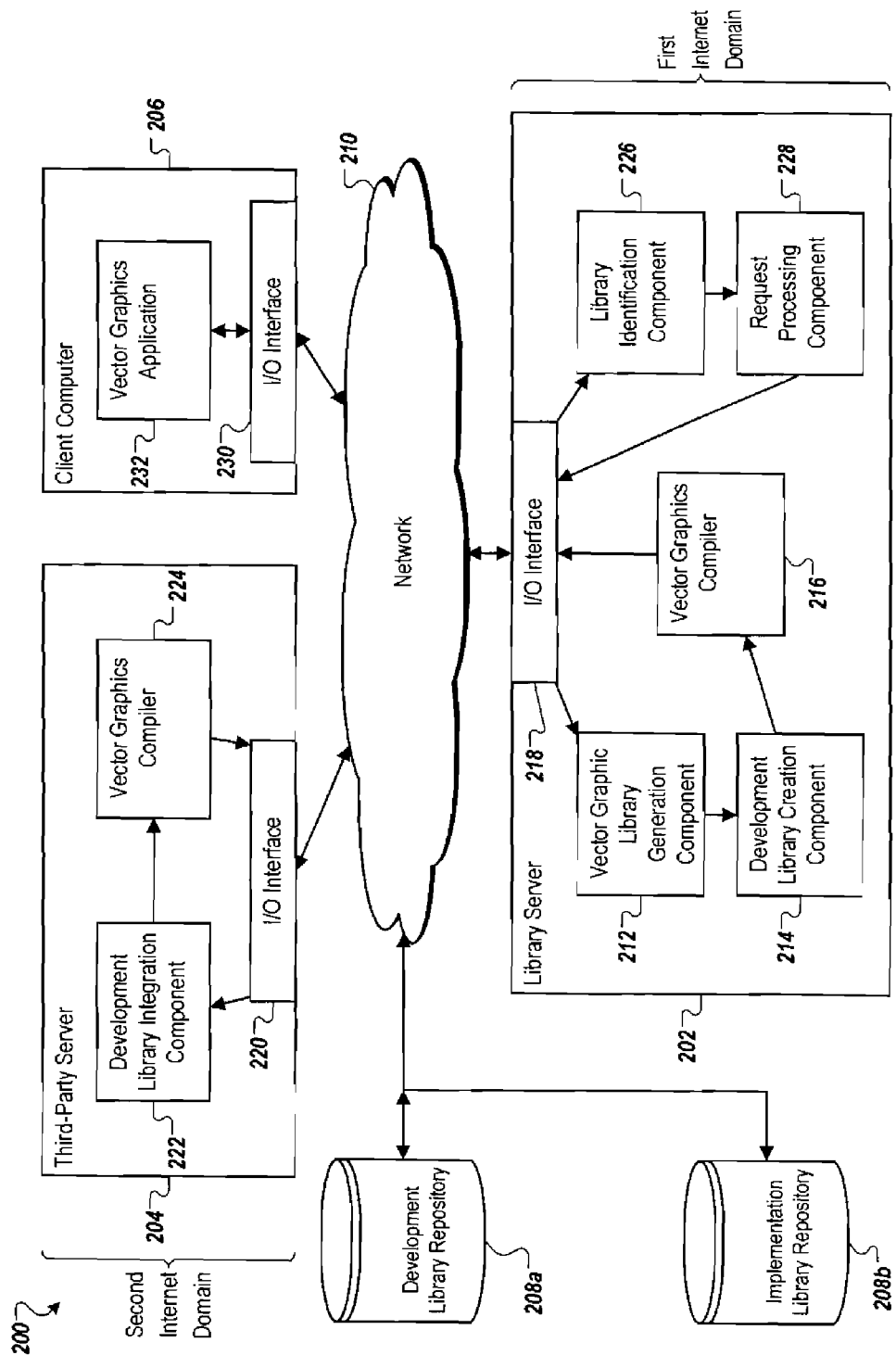
FIG. 2 is a diagram of an example system for performing cross-domain linking of data types in a vector graphics application.

FIG. 2 is a diagram of an example system 200 for performing cross-domain linking of data types in a vector graphics application. The system 200 can include a library server 202, a third-party server 204, and a client computer 206. The system 200 may be similar to the system 100 discussed above with regard to FIG. 1. For example, the library server 202 may be similar to the library server 102.

Similar to the system 100 as described above with reference to FIG. 1, the library server 202 can host a first internet domain (www.firstdomain.com) and the third-party server 204 can host a second internet domain (e.g., www.seconddomain.com). The client computer 206 can use a vector graphics application (e.g., a FLASH application) to execute vector graphics files (e.g., FLASH files) received from the library server 202 and the third-party server 204. Through instructions created by the library server 202 and included in the vector graphics files received by the client computer 206, data types can be shared across a domain boundary within the vector graphics application by cross-domain linking and/or cloning data types.

The library server 202 can be any appropriate sort of computing device that is capable of generating vector graphics files and responding to client requests. For example, the library server 202 can be a desktop computer, a rack-mounted server, a distributed computing system (e.g., a collection of servers and/or computers), a portable computing device (e.g., a laptop), etc. Similarly, the third-party server 204 can be any sort of computing device that is capable of generating vector graphics files and responding to client requests. For instance, the third-party server 202 can be a desktop computer, a rack-mounted server, a distributed computing system (e.g., a collection of servers and/or computers), a portable computing device (e.g., a laptop), etc.

The client computer 206 can be any sort of computing device that is capable of receiving vector graphics files from the library server 202 and the third-party server 204, and of executing the received vector graphics files with a vector graphics application (e.g., running a FLASH application at runtime). For example, the client computer 206 can be a desktop computer, a server (e.g., a home media server), a distributed computing system (e.g., a collection of servers and/or computers), a portable computing device (e.g., a laptop, a PDA), a mobile phone, a video game system, an embedded computing device (e.g., a navigation computer and display embedded within the console of an automobile), etc.

The system 200 can additionally include data repositories 208a-b and a network 210. The data repositories 208a-b can be any sort of computing device that is capable of data storage and retrieval, such as a desktop computer, a rack-mounted server, a distributed computing system (e.g., a collection of servers and/or computers), etc. The network 210 can enable communication between the library server 202, the third-party server 204, the client computer 206, and the data repositories 208a-b. The network 210 can be any type of network enabling communication between such devices, such as the Internet, an intranet, a wide area network (WAN), a local area network (LAN), a tether between devices (e.g., point-to-point connection), a direct connection between devices (e.g., hard-wired connection), etc.

The library server 202 can include an input-output interface 218 (I/O interface) that receives instructions regarding the creation of a vector graphics file to perform cross-domain linking within a vector graphics application. The I/O interface 218 can receive these instructions from a source (e.g., a user) that is external to the library server 202 and can forward the instructions to a vector graphics library creation component 212. The vector graphics library creation component 212 can create an implementation vector graphics library file that fully-implements classes, objects, methods, even handlers, etc. in such a manner that they can perform cross-domain linking and/or cloning when executed by a vector graphics application. For example, the implementation vector graphics library creation component 212 can create the library FLASH file 108, as described above with reference to FIG. 1.

The vector graphics library creation component 212 can forward the created implementation vector graphics library file to a development library creation component 214. The development library creation component 214 can create a development vector graphics library file that defines stubs (e.g., wrappers) of the classes, objects, methods, even handlers, etc. contained in the implementation vector graphics file. Although independent of each other, the vector graphics library creation component 212 and the development library creation component 214 can share the same portions of the same source. This shared source can permit the development library creation component 214 to create the development vector graphics library file separate from the implementation library. The development vector graphics library file can be created in such a manner that it links to and/or clones the corresponding classes, objects, methods, even handlers, etc. defined in the implementation vector graphics library file. For example, the development library creation component 214 can create the development library FLASH file 110, as described above with reference to FIG. 1.

The vector graphics library creation component 212 and/or the development library creation component 214 can forward the created implementation and development vector graphics library files (e.g., .as/.mxml source file) to a vector graphics compiler 216 (e.g., a FLEX compiler). The vector graphics compiler 216 can compile the library files into a format that a vector graphics application is capable of executing. For example, if the library files are ACTIONSCRIPT files and the vector graphics compiler 216 is FLASH compiler, the library files can be compiled into SHOCKWAVE FLASH (or FLASH for short) files. In some implementations, the implementation vector graphics library file is compiled and the development vector graphics library file is not.

The vector graphics compiler 216 can send, via the I/O interface 218, the library files to the data repositories 208a-b for storage. The data repository 208a can store the (compiled or uncompiled) development vector graphics library file. The data repository 208b can store the compiled implementation vector graphics library file.

The third-party server 204 can request the created development vector graphics library file from the library server 202 and/or from the development library repository 208a. The third-party server 204 can make such a request and receive the development vector graphics library file via an I/O interface 220 contained in the third-party server 204. The I/O interface 220 can forward the development vector graphics library file to a development library integration component 222, which integrates the development vector graphics library file into a program vector graphics file (e.g., the FLASH application file 112). The program vector graphics file can make reference to the data types, methods, events, etc. contained in the development vector graphics library file. For example, the program vector graphics file can be the FLASH application file 112 described above with reference to FIG. 1.

The development library integration component 222 can forward the program vector graphics file integrated with the development vector graphics library file to a vector graphics compiler 224. Similar to the vector graphics compiler 216 of the library server 202, the vector graphics compiler 224 can compile the program vector graphics file with the development library into a file format (e.g., compile from an ACTIONSCRIPT into a SHOCKWAVE FLASH file) that the vector graphics application (e.g., FLASH PLAYER) can execute.

Although not depicted, the vector graphics compiler 224 can send the compiled program vector graphics file to a repository (similar to the implementation library repository 208b) for storage until receiving a request for the file from the client computer 206. Through the network 210 and the I/O interface 220, the third-party server 204 can receive and process a request from the client computer 206 for the compiled program vector graphics file. In response, the third-party server 204 can send the requested program vector graphics file to the client computer 206.

The client computer 206 can receive the program vector graphics file at an I/O interface 230, which can forward the received file to a vector graphics application 232 (e.g., a FLASH PLAYER application) running on the client computer 206. The vector graphics application 232 can execute the program vector graphics file upon receipt. The program vector graphics file can instruct the vector graphics application 232 to obtain the implementation library vector graphics file from the library server. As such, the vector graphics application 232 can send a request to the library server 202 through the I/O interface 230 and the network 210.

The library server 202 can receive the request at the I/O interface 218, which can in turn forward the request to a library identification component 226. Based upon the request, the library identification component 226 can identify the implementation library vector graphics file to fulfill the request. For example, the request may identify a name and version of the development library vector graphics file integrated into the program vector graphics file being executed by the client computer 206. Based upon this information, the library identification component 226 can identify a compatible implementation library vector graphics file from the implementation library repository 208b.

Once the appropriate library has been identified, the library identification component 226 can forward the identification to the request processing component 228. The request processing component 228 can retrieve the appropriate library vector graphics file from the implementation library repository 208b and send it to the client computer 206 via the I/O interface 218 and the network 210.

The client computer 206 can receive the requested implementation library vector graphics file at the I/O interface 230, which in turn forwards the implementation library to the vector graphics application 232. The vector graphics application 232 can then proceed to execute the implementation library which, in combination with the program vector graphics file from the third-party server 204, can perform cross-domain data type sharing via linking and/or cloning. The vector graphics application 232 can execute the program and implementation library vector graphics files in separate, independent environments, similar to the independent environments 116 and 120. The program and implementation library vector graphics files can perform cross-domain linking and/or cloning operations when executed (by the vector graphics application 232) similar to those described above with reference to the library FLASH file 108, the FLASH application file 112, and the FLASH application 114.

For example, the vector graphics application 232 can be a FLASH PLAYER application that receives a program FLASH file (e.g., a game, a mapping program, a news feed program, a video player program, a content development program, etc.). The program FLASH file can request an API that contains fully-implemented data types (e.g., objects), methods, and events that are needed to enable the functionality of the program FLASH file. The program FLASH file can request the API from the library server 202, which in turn can retrieve and send it from the implementation library repository 208b to the client computer 206. Upon receipt, the API can proceed to share data types, methods, and events it defines with the program FLASH file via linking and cloning across a domain boundary in the FLASH PLAYER application.

Figure 3:
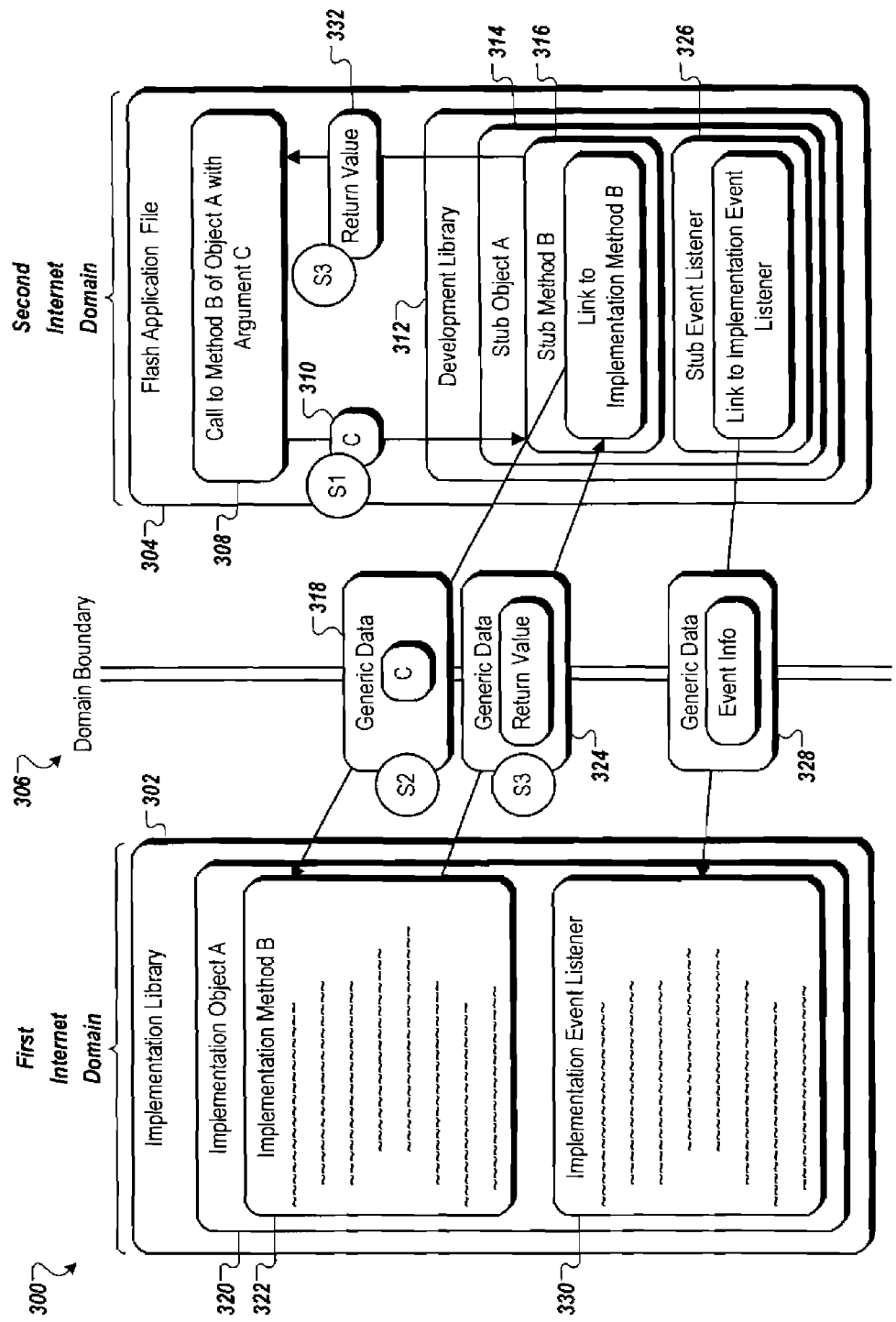
FIG. 3 is a diagram of an example system for performing cross-domain linking of objects within a FLASH application running on a client computer.

FIG. 3 is a diagram of an example system 300 for performing cross-domain linking of objects within a FLASH application running on a client computer. The system 300 may be similar to portions of the systems 100 and 200, as described above with reference to FIGS. 1 and 2. For example, the system 300 may be similar to the depiction of the FLASH application 114 in FIG. 1.

The system 300 includes an implementation library 302 and a FLASH application file 304 that are separated by a domain boundary 306. Similar to the description above with regard to FIG. 1, the implementation library 302 and the FLASH application file 304 can be executed in separate, independent execution environments within a FLASH application. As depicted, the implementation library 302 can be received from a first internet domain (e.g., www.firstdomain-.com) and the FLASH application file 304 can be received from a second internet domain (e.g., www.seconddomain-.com).

In executing the FLASH application 304, a call 308 to a method B of an object A can be made with an argument C. The call 308 can be an instruction within the FLASH application file 304 that is executed. An object A 314 can be instantiated as a data type defined by a development library 312. The development library 312 can be part of the FLASH application file 304. Similar to the development library FLASH file 110, the development library 312 can define stubs of fully implemented objects, methods, event handlers, etc. that are defined in the implementation library 302. The object A 314 is depicted as a stub of an implementation object A 320 that is instantiated by the implementation library 302. As a stub, the object A 314 can contain stub methods, stub even handlers, and stub data (e.g., other stub objects) that refer to the object A 320 for a full implementation.

In the example system 300 depicted, the stub object A 314 includes a stub method B 316 and a stub event listener 326. In some implementations, the stub method B 316 and the stub event listener 326 can include links (e.g., pointers) to corresponding an implemented method B 322 and an implemented event listener 330, respectively. In other implementations, a link between the stub object A 314 and the implementation object A 320 can be established. The links can be established at run-time (e.g., when the FLASH application file 304 and the implementation library 302 are being executed) similar to the manner described above with respect to FIG. 1.

In executing the call 308, an argument C 310 can be passed to the stub method B 316 of the stub object A 314 (as depicted at step S1). The argument C 310 can be typed data (e.g., not generic, untyped data). For example, the argument C 310 can be of a data type defined in the development library 312. Upon receiving the argument 310, the stub method B 316 can perform a conversion (e.g., using a domain wrapper) of the argument C 310 into an object that can be consumed by the implementation method B 322. The stub method B 316 can use the link to redirect the call 308 and the argument C 310 to the fully-implemented method B 322 that is part of the implementation object A 320.

The call 308 with argument C can be redirected over the domain boundary 306 to the implementation method B 322 (as depicted at step S2). Since the typed argument C is passed over the domain boundary 306, the implementation method B 322 can receive the argument C as generic, untyped data 318. The implementation method B 322 can then perform the redirected call using the passed argument 318.

In some implementations, the argument C is passed to the implementation method B 322 by-reference. In such implementations, a reference (e.g., memory address) for the argument C can be passed and received as generic data 318. Any modifications of argument C's value can be reflected in argument C 310 received by the stub method B 316 received as part of the call 308. In other implementations, the argument C is passed to the implementation method B 322 by-copy (value). In such implementations, a copy of the argument C 310 is passed to and received by the implementation method B 322 as the generic data 318. Modifications to the received generic data 318 by the implementation method B 322 will not be reflected in the argument C 310 passed to the stub method B 316.

Upon receiving the redirected call, the implementation method B 322 (or a domain wrapper on the implementation library 302 side of the domain boundary 306) can determine whether the argument C passed across the domain boundary 306 as the generic data 318 is a stub (e.g., another stub object instantiated from the development library 312). If the argument C is a stub, then the implementation method B 322 can resolve the stub to its corresponding implementation on the implementation library 302 side of the domain boundary 306. For example, if the argument C 310 is an instantiated stub object D (not depicted) that is passed (either by-reference or by-copy) to the implementation method B 322, then the implementation method B 322 can locate an instantiated implementation object D to which the stub object D corresponds. The implementation method B 322 can then proceed to use the resolved implementation object (e.g., implementation object D) instead of the stub object for processing the redirected call.

The calls to the stub method B 316 and the implementation method B 322 can be synchronous, stack-based method calls. This means that processing of the stub method B 316 can proceed automatically upon completion of the implementation method 322 (e.g., without the implementation method B 322 having to communicate to the stub method B 316 that processing of the implementation method B 322 has finished) . For example, when these two methods make calls to each other, each successive call is placed at the top of a stack of method calls for processing. The application executing these methods (e.g., a FLASH PLAYER application) then proceeds to process a method at the top of the stack. When processing of the method at the top of the stack is finished, the top method is removed from the stack and processing of the next method on the stack begins. Thus, when the implementation method B 322 is finished, the application processing these methods can return to processing the stub method B 316 (the stub method B 314 can remain on the stack when it calls the implementation method B 322). Processing of the stub method B 316 can resume without the implementation method B 322 having to communicate to the stub method B 316 that processing of the implementation method B 322 has finished.

Once the stub method B 316 has received and interpreted the generic data 324, the stub method B 316 can pass the typed return value 325 back to the call 308 (as depicted at step S4). Given the use of links between the stub method B 316 and the implementation method B 322, the call 308 can employ the implemented method B 322 without having to know the complexity involved with cross-domain linking of objects 314 and 320. The call 308 can operate as if though the implementation object A 320, and its implementation method A 322, were instantiated on the second internet domain side of the domain boundary 306.

As mentioned previously, the stub object A 314 can include the stub event listener 326 and the implementation object A 320 can include the implementation event listener 330. Both the stub object A 314 and the implementation object A 320 can additionally include an event dispatcher (e.g., a method, an object). The event dispatcher can be responsible for invoking the appropriate event listeners when an event occurs. The stub event listener 326 can be a method that is designated to receive a notification when a specified event (e.g., a mouse click, a window receiving focus, etc.) occurs on the second internet domain side of the domain boundary 306 (e.g., occurs within the independent environment within which the FLASH application file 304 is executed). Similar to the stub method B 316, the stub event listener 326 can have a link to the implemented event listener 330.

When the stub event dispatcher (not depicted) receives notification that an event has occurred, the event dispatcher can invoke the stub event listener 326. The stub event listener 326 can redirect the notification to the implementation event listener 330 across the domain boundary 306 to an implementation event dispatcher (not depicted). The implementation event dispatcher can in turn invoke the implementation event listener 330, which receives information regarding the event (e.g, an argument for an x mouse click coordinate, an argument for an y mouse click coordinate, etc.) as generic data 328. The stub event listener 326 can convert the event information 328, which can be passed across the domain boundary 306 as generic data, into an appropriate type for the stub event listener 326 and the implementation event listener 330.

The implementation event listener 330 can process the event using the generic data 328 and, although not depicted, pass a return value to the stub event listener 326 (similar to the return value passed as the generic data 324). In some implementations, there may be predefined event listeners. In such implementations, the above described event linking across the domain boundary 306 can be enabled by defining the stub event listener 336 and the implementation event listener 330 to override the predefined event listeners.

Figure 4:
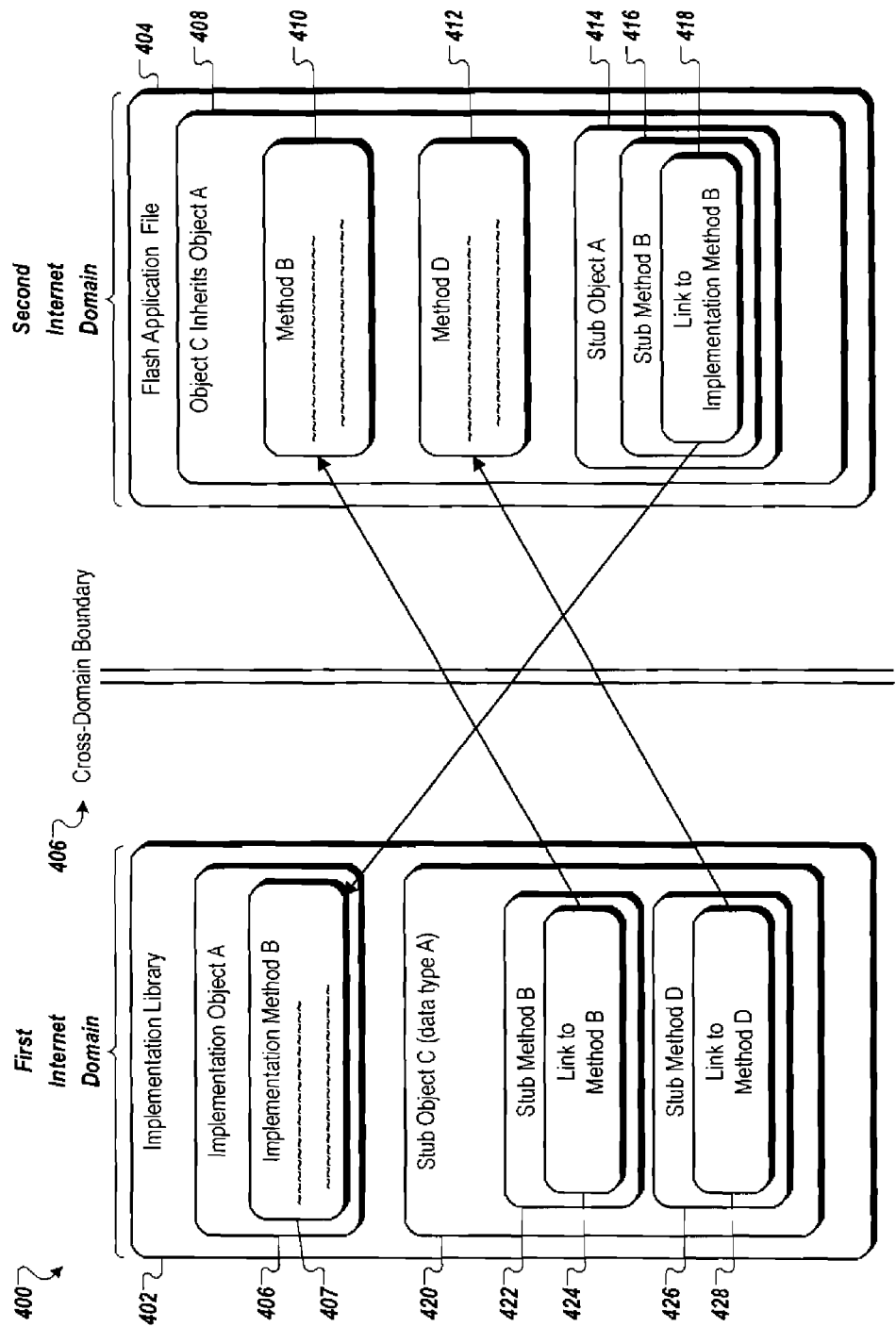
FIG. 4 is a diagram of an example system for performing cross-domain linking of objects having cross-domain inheritance within a FLASH application running on a client computer.

FIG. 4 is a diagram of an example system 400 for performing cross-domain linking of objects having cross-domain inheritance within a FLASH application running on a client computer. The system 400 may be similar to portions of the systems 100, 200, and 300, as described above with reference to FIGS. 1-3.

Similar the system 300 depicted in FIG. 3, the system 400 includes an implementation library 402 and a FLASH application file 404 that are separated by a domain boundary 406. The implementation library 402 and the FLASH application file 404 can be executed in separate, independent execution environments within a FLASH application. As depicted, the implementation library 402 can be received from a first internet domain and the FLASH application file 404 can be received from a second internet domain.

In the system 400, the implementation library 402 can define and instantiate an implementation object A 406 that contains an implementation method B 407. The FLASH application file 404 can define and instantiate an object C 408 that inherits (e.g., extends, overrides, etc.) an implementation object A 406 (e.g, the class C can inherit the class A). For instance, with a class A defined in the implementation library 402 and a class stub A defined in the developer library, a class C can extend the class stub A and modify the implementation of method B.

The object C 410 can define a method B 410 that overrides the implementation method B 407 and a method D 412 that is not provided in the implementation object A 406. The object C 410 can further include a stub object A 414 that refers to the implementation object A 406. A stub method B 416 with a link 418 to the implementation method B can be Included in the stub object A 414. The object C 410 can include the stub object A 414 so that the object C 410 can call the original (not extended) implementation method B 407, if needed. For instance, a call to the stub method B 416 may be included as part of the method B 410 (e.g., the method B 410 may define additional instructions that are to be executed before or after the implementation method B 407 is called).

The steps by which a call from the method B 410 migrates to the stub method B 416 and the implementation method B 407 can be similar to the steps S1-4 described above with reference to FIG. 3.

The implementation library 402 can additionally include a stub object C 420 that corresponds to the object C 408 inheriting the implementation object A 406. In some implementations, since class "C" extends class "A" defined within the library, objects of type "C" can passed into the implementation library and appear to the implementation library just like objects of type "A". The implementation library can include a stub for type "A". Because type "C" implements all the same methods defined publicly in type "A", an object of type "C" can be passed back into the implementation library to any method call that accepts an argument of type "A". A stub for an object of type "A" can be created by the library and object C can be called whenever a method of the stub for object A is invoked.

The stub object C 420 can include a stub method B 422 having a link 424 to the method B 410 (the method overriding the implementation method B 407) of the instantiated object C 408. The stub object C 420 can additionally include a stub method D 426 having a link 428 to the method D 412 of the object C 408. In some implementations, the links between the stub methods B 424 and D 428 can instead be represented by a single link between the stub object C 420 and the implementation object C 408. In such implementations, the methods can be invoked by name through this link.

The stub object C 420 can be called on the first internet domain side of the domain boundary 406 in a variety of scenarios. For instance, assume a function making a call to the method B 410 of object C 408 is passed as an argument to the implementation method B 407. When the implementation method B 407 executes the function argument and, in turn, calls the method B 410, it will call the stub method B 422 of the stub object C 420. When the stub method B 422 is called, it can use the link 424 and redirect the call to the method B 410 of the object C 408. The method B 410 can, in turn, call the implementation method B 407 via the stub method B 416 and its link 418 (e.g., the method B 410 can extend the implementation method B 407 by having additional instructions before and/or after calling the method B 410). Thus, in this example scenario, the call made to the implementation method B 407 has gone full-circle. Any values returned from these methods can be passed via the called methods in a reverse order.

The stub objects 414 and 420 can be instantiated in a manner similar to object instantiation described above with reference to FIGS. 1 and 3. The links 418, 424, and 428 can be established in a manner similar to link establishment described above with reference to FIGS. 1 and 3.

Figure 5:
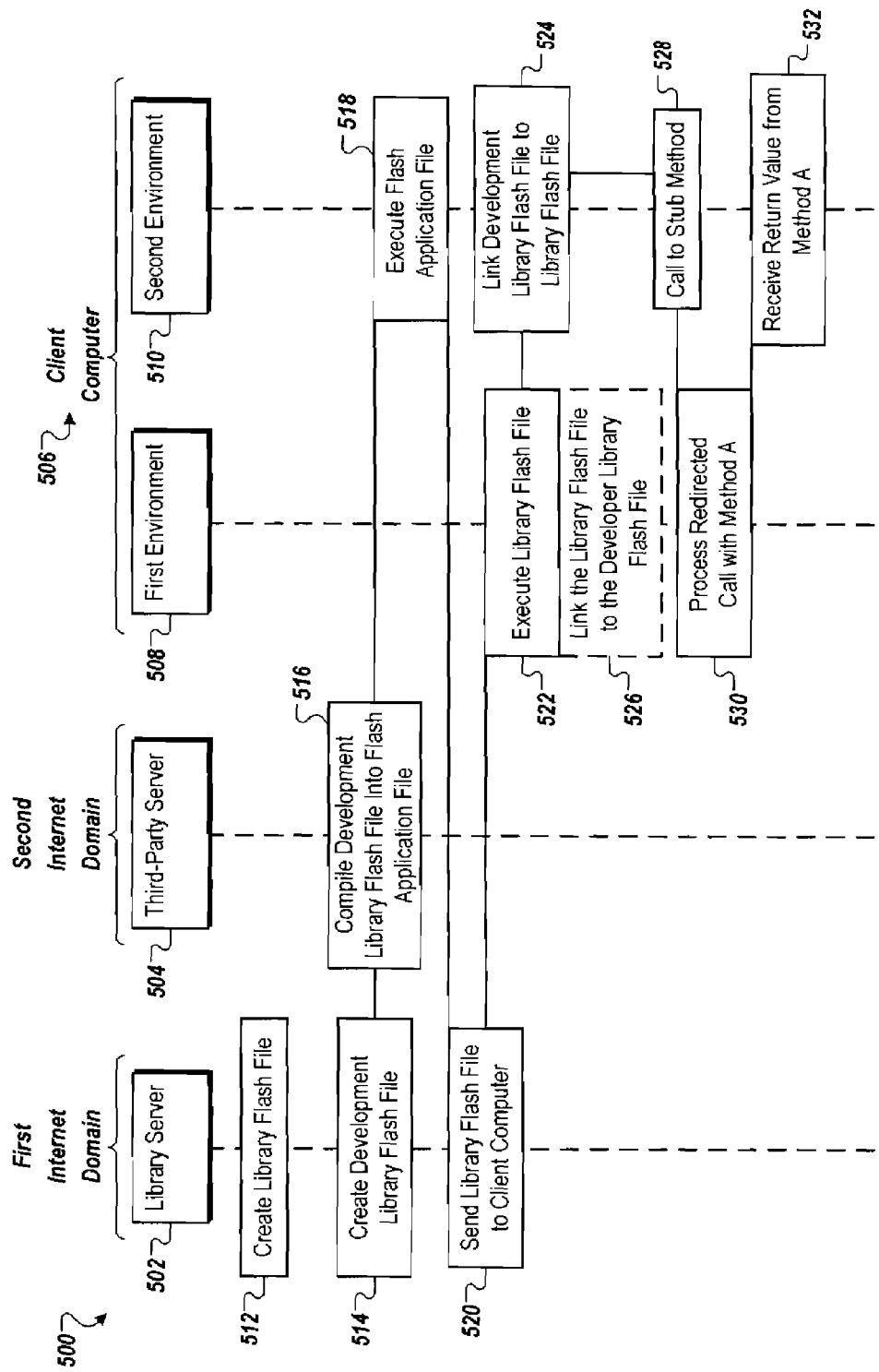
FIG. 5 is a timeline depicting an example cross-domain linking process.

FIG. 5 is a timeline 500 depicting an example cross-domain linking process. The process depicted in the timeline 500 may be performed, for example, by a system such as the systems 100-400 and, for clarity of presentation, the description that follows uses the systems 100-400 as the basis of an example for describing the processes. However, another system, or combination of systems, may be used to perform the process depicted in the timeline 500.

The timeline 500 depicts a library server 502 associated with a first internet domain, a third-party server 504 associated with a second internet domain, and a client computer 506 having a first environment 508 associated with the first internet domain and a second environment 510 associated with the second internet domain. The library server 502, the third-party server 504, and the client computer 508 may be similar to the library servers (102 and 202), the third-party servers (104 and 204), and the client computers (106 and 206) described above with reference to FIGS. 1 and 2. The fist environment 508 and the second environment 510 may be similar to the environments described on either side of the domain boundaries (306 and 406) described above with reference to FIGS. 3 and 4.

At time 512, the library server 502 creates a library FLASH file (e.g., library FLASH file 108, implementation library 302, implementation library 402, etc.). As described above, the library FLASH file can be created such that it will enable linking and/or cloning across a domain boundary in the client compute 506 at run-time. At time 514, the library server 502 creates a development library FLASH file (e.g., development library FLASH file 110, development library 312, etc.). As described above, the development library FLASH file contains stubs of the methods, classes, data types, events, etc. that are in the library FLASH file. The stubs in the created development library FLASH file can also be created to enable linking and/or cloning across a domain boundary in the client compute 506 at run-time.

The library server 502 can send the created development library FLASH file to the third-party server 504. At time 516, the third-party server 504 can compile the development library FLASH file into a FLASH application file (e.g., FLASH application file 112, FLASH application file 304, FLASH application file 404, etc.). The FLASH application file can include code that references the stub data types, classes, method, events, etc. defined in the development library FLASH file.

At time 518, the second environment 510 of the client computer 506 can receive (from the third-party server 504) and execute the FLASH application file 518. The FLASH application file 518 can be executed by the second environment 510 because the third-party server 504, from which the FLASH application file was received, is associated with the second internet domain. Execution may be performed by an application running on the client computer 506 capable of executing FLASH files, such as a FLASH PLAYER application. Upon execution, the FLASH application file may instruct the client computer 506 to retrieve the created library FLASH file from the library server 502.

In response to a request from the client computer 506, the library server 502 can send the library FLASH file to the client computer (time 520). Since the library FLASH file 520 is received from the library server 502, which is associated with the first internet domain, the library FLASH file can be executed in the first environment 508 (time 522).

With the library FLASH file being executed on the first environment 508 separate from the FLASH application file being executed on the second environment 510, the FLASH application file can link the stubs in the development library FLASH file (compiled as part of the FLASH application file) to corresponding fully-implemented methods, objects, events, etc. in the library FLASH file (time 524). As described above, linking can be accomplished using unique identifiers associated with each portion (e.g., method, object, event, etc.) of the two FLASH files that is to be linked. Alternatively (or in combination with linking), portions of the library FLASH file can be cloned from the first environment 508 into the second environment 510 (step 524).

If the library FLASH file contains stubs (as described with reference to FIG. 4), the library FLASH file may optionally link its stubs to corresponding fully-implemented methods, objects, events, etc. in the development library FLASH file (time 526). Alternatively (or in combination with linking), portions of the development library FLASH file can be cloned from the second environment 510 into the first environment 508 (step 526).

At time 528, a call to a stub method A (which can be part of an object) can be made in the second environment 510 (e.g., call 308, etc.). The call can be made from the FLASH application file and the stub method A can be defined in the development library FLASH file. Through a link contained in the stub method A, the call to the stub method A can be redirected from the second environment 510 and to an implementation method A on the first environment 508. The implementation method A can process the redirected call (time 530). Arguments passed with the call can be passed as generic data (e.g., generic data 318) that the implementation method A is capable of interpreting with an appropriate type, as described above. At time 532, a return value can be passed from the first environment 508 and to the stub method A on the second environment 510. The sub method A can receive the return value and redirect the return value to a location in the FLASH application file from which the call at time 528 originated (time 532).

Figure 6:
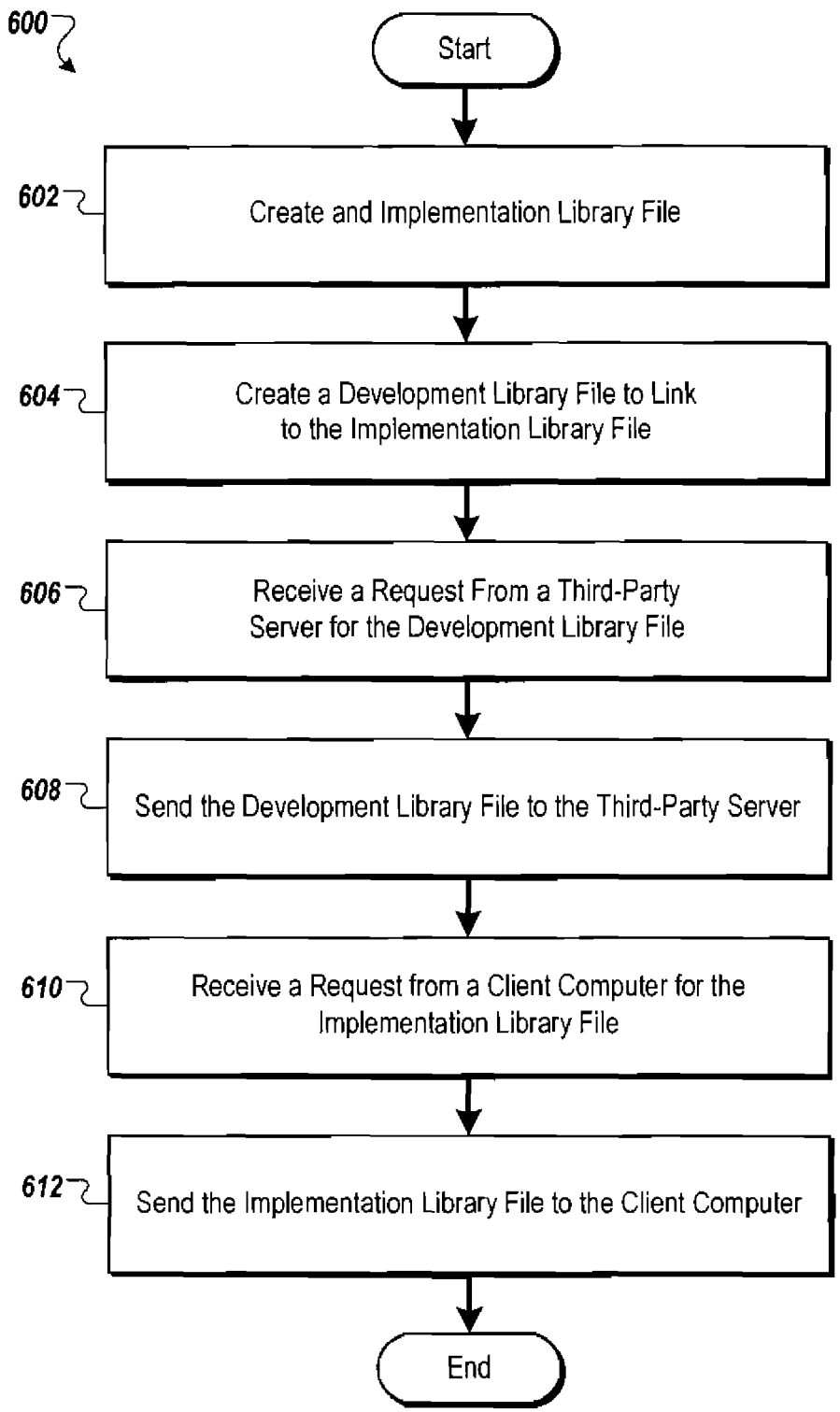
FIG. 6 is a flowchart of an example process for creating and serving files that can enable cross-domain linking of data types.

FIG. 6 is a flowchart of an example process 600 for creating and serving files that can enable cross-domain linking of data types. The process 600 may be performed, for example, by a system such as the systems 100 and 200 and, for clarity of presentation, the description that follows uses the systems 100 and 200 as the basis of an example for describing the processes. For instance, the process 600 may be performed by a library server, such as the FLASH library server 102 or the library server 202. However, another system, or combination of systems, may be used to perform the process 600.

Beginning at step 602, an implementation library file (e.g., the library FLASH file 108) can be created. The created implementation library file can be configured to perform cross-domain linking and cloning of data types in conjunction with a development library file. The implementation library can be a vector graphics file (e.g, a FLASH file) or any other type of formatted file that a vector graphics application (e.g., a FLASH PLAYER application) running on a client computer can reference and/or execute.

A development library file can be created to link to the created implementation library file (step 604). Similar to the development library FLASH file 110, the created development library can contain stubs of methods, classes, objects, events, etc. that are defined in the implementation library file. The development library file can be a vector graphics file (e.g, a FLASH file) or any other type of formatted file that a vector graphics application (e.g., a FLASH PLAYER application) running on a client computer can reference and/or execute.

A request can be received from a third-party server for the development library file (step 606). In response, the development library file can be sent to the third-party server (step 608) (e.g., the development library FLASH file 110 being sent fro the FLASH library server 102 to the third-party server 104 as depicted at step A in FIG. 1). The third-party server can compile the received development library file with a program file (e.g., the FLASH application file 112) that references the stubs defined in the development library file. The third-party server can send the compiled program file to a client computer to be executed by a vector graphics file (e.g., a FLASH PLAYER application).

A request can be received from the client computer for the implementation library file (step 610). The request may be triggered when the development library file is executed by the client computer, as discussed above with reference to FIG. 1. In response to the request, the implementation library file can be sent to the client computer (step 612). After sending the implementation library file, the process 600 can end. However, the client computer can link and/or clone the received implementation library file to the development library file to permit data types to be shared across a domain boundary within the client computer, similar to the description above with regard to FIGS. 1-4.

Figure 7A:
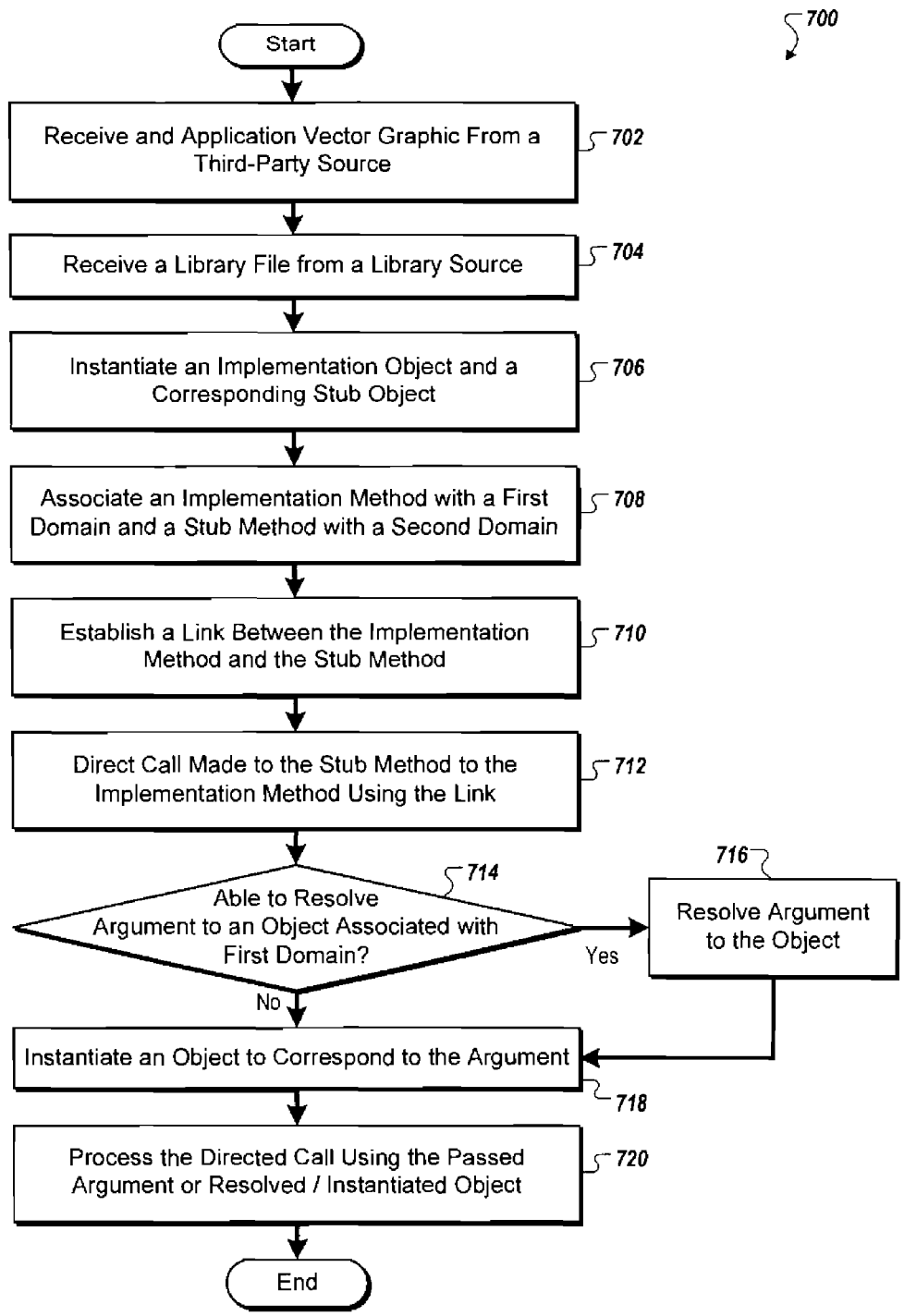
FIGS. 7A-B are flowcharts of example processes for performing cross-domain linking and/or cloning of data types using received library and application files.
Figure 7B:
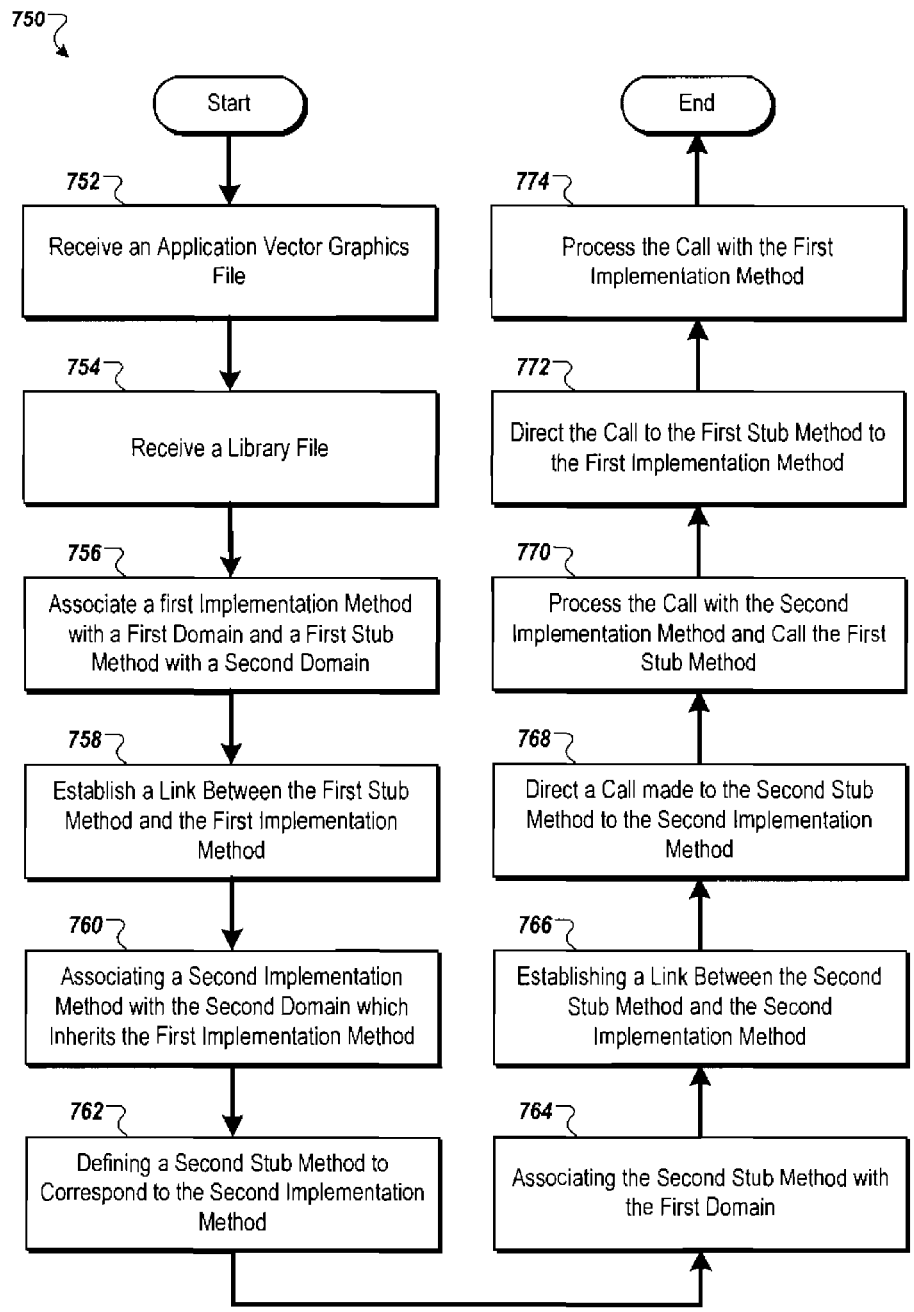

FIGS. 7A-B are flowcharts of example processes 700 and 750 for performing cross-domain linking and/or cloning of data types using received library and application files. The processes 700 and 750 may be performed, for example, by a system such as the systems 100-400 and, for clarity of presentation, the description that follows uses the systems 100-400 as the basis of an example for describing the processes. For instance, the processes 700 and 750 may be performed by a client computer, such as the client computers 106 and 206. However, another system, or combination of systems, may be used to perform the processes 700 and 750.

The process 700 relates to linking a method (or objects that include the method) across a domain boundary and then making a cross-domain method call. The process 700 can begin at step 702 by receiving an application vector graphics file from a third-party server (e.g., receiving the FLASH application file 112 at the client computer 106, as depicted at step C in FIG. 1). The application vector graphics file can include a development library containing stubs of methods, classes, object, events, etc. contained in an implementation library, as described above with reference to FIGS. 1-6. A library file (e.g., the library FLASH file 108) can be received from a library server (step 704). The library file can include fully-implemented methods, classes, object, events, etc. to which the development library file within the application vector graphics file can link and invoke.

In some implementations, an implementation object (e.g., an object that is fully-implemented) can be instantiated along with a corresponding stub object (e.g., an object containing a pointer to a fully-implemented object) (step 706). The implementation object can contain an implementation method and the stub object can contain a stub method. The implementation object and/or the implementation method can be associated with a first domain and the stub object and/or the stub method can be associated with a second domain (step 708)—meaning they may be executed within separate environments (e.g., separated by a domain boundary).

In other implementations, an implementation method (defined separately from an object) can be associated with the first domain and a stub method (defined separately from an object) can be associated with the second domain (step 708).

A link (e.g., a pointer) can be established between the implementation method and the stub method (step 710) (or between the objects implementing the methods). The link can be established similar to the manner described with reference to FIG. 1. A call made to the stub method can be directed to the implementation method using the established link (step 712). Such a directed call can traverse the domain boundary separating the stub and implementation methods, as depicted with respect to FIGS. 3 and 4.

The directed call can pass an argument. In instances where an argument is passed, an attempt can be made to resolve the argument to an instantiated object of the appropriate data type (step 714). If the argument can be resolved, then the argument is resolved to the instantiated object (step 716). If the argument cannot be resolved, then an object of the data type can be instantiated (step 718). The call can be processed by the implementation method using the passed argument (if resolution is not needed, such as for an argument that is passed by copy) or using the resolved or instantiated object corresponding to the argument (step 720). Such processing of a call directed over a domain boundary with a resolved or instantiated object can be similar to the manner described with reference to FIGS. 1, 3, and 4. After processing the directed call, the process 700 can end.

The process 750 relates to linking (objects) and making cross-domain method calls with a method that is inherited across a domain boundary. The process 750 may be similar to the description above with regard to FIG. 4. Similar to the steps 702 and 704 described above, an application vector graphic file and a library file can be received (steps 752 and 754). Similar to step 708, a first implementation method can be associated with a first domain and a first stub method can be associated with a second domain (step 756). Similar to step 710, a link can be established between the first stub method and the first implementation method (or between a first stub object and a first implementation object).

In addition to the first implementation method and the first stub method, the received application vector graphic file and library file can include a second implementation method and a second stub method. The second implementation method can be associated with the second domain and can inherit (e.g., extend, override, etc.) the first implementation method (step 760). In response to the second implementation method inheriting the first implementation method, a second stub method can be defined to correspond to the second implementation method (step 762). The second stub method can be associated with the first domain (step 764). A link between the second stub method and the second implementation method can be established (step 766) (or between a second stub object and a second implementation object).

Similar to the step 712, a call made to the second stub method can be directed to the second implementation method (the method inheriting the first implementation method) (step 766). The second implementation method can process the directed call and, as part of the processing the call, can make a call to the first stub method (step 770). As described above with reference to FIG. 4, the second implementation method may extend the first implementation method by adding instructions before and/or after calling the first implementation method. In such instances, the second implementation method can make a call to the first implementation method when being executed.

The call made to the first stub method can be directed to the first implementation method (772). The call directed to the first implementation method can then be processed by the first implementation method (774). After processing the call directed to the first implementation method, the process 700 can end.

Figure 8:
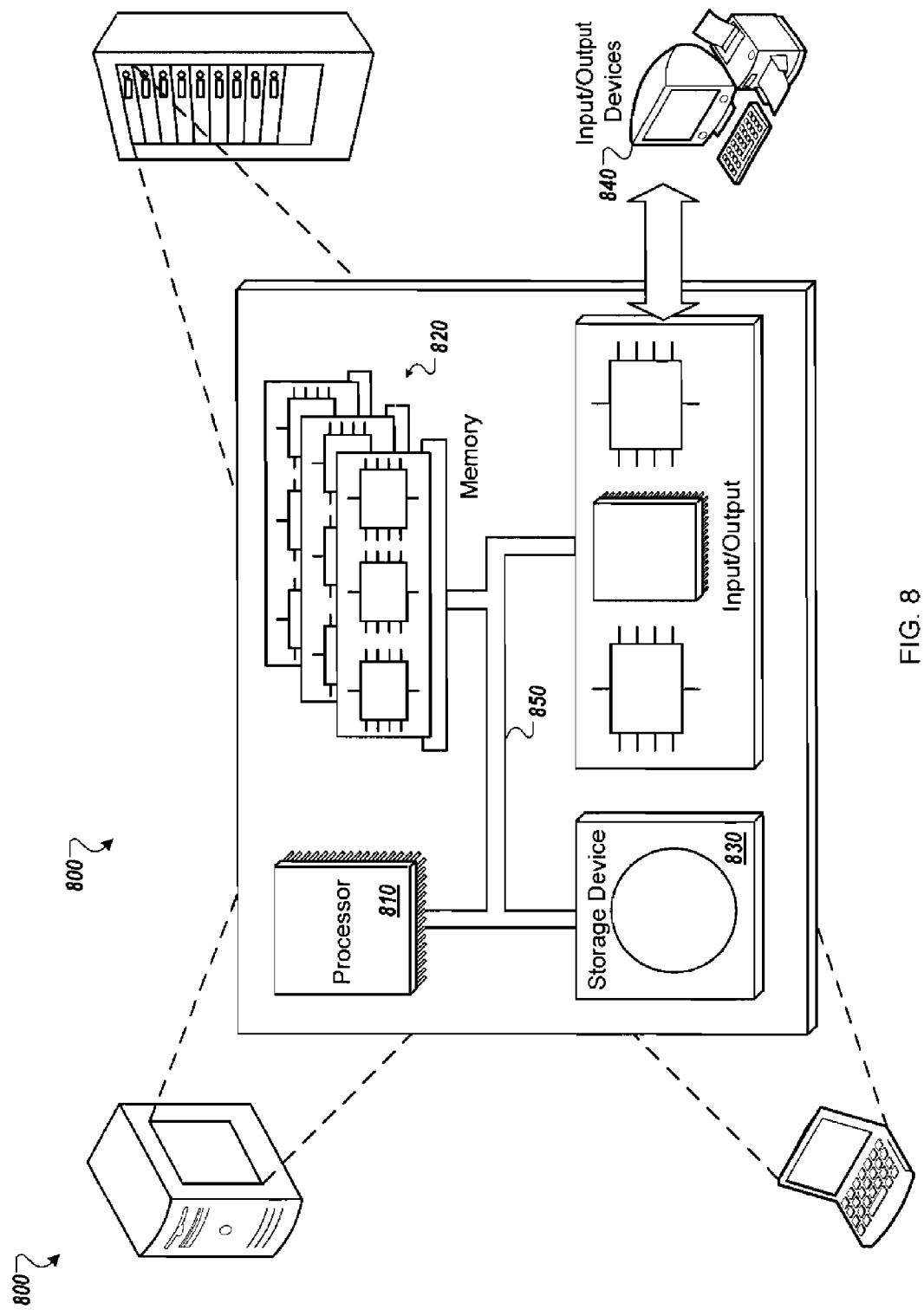
FIG. 8 is a schematic diagram of a computer system.

FIG. 8 is a schematic diagram of a computer system 800. The system 800 can be used for the operations described in association with any of the computer-implement methods described previously, according to one implementation. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) FLASH drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and FLASH memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, although the examples have been stated mainly in relation to FLASH technology, the mechanisms described here could be used, in appropriate circumstances, with SILVERLIGHT. Moreover, other mechanisms for enabling cross-domain data type sharing may be used. Additionally, other mechanism for performing cross-domain linking and/or cloning may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    receiving, at a first server corresponding to a first domain, a request from a client computer for a library file that includes instructions that implement a implementation method that is associated with a first unique identifier; and
    sending the library file to the client computer, the client computer having received an application file from a second server corresponding to a second domain, wherein the application file includes instructions that implement a stub method to direct calls to the implementation method, wherein the stub method is associated with a second unique identifier, and wherein executing the library file and the application file causes the client computer to perform operations comprising:
        associating the implementation method with the first domain and the stub method with the second domain so that the implementation method is restricted to receiving an argument from the stub method as data without an associated data type;
        establishing a link between the implementation method and the stub method using the first unique identifier and the second unique identifier;
        receiving a call to the stub method made by code executed in association with the second domain, the call having an argument associated with a data type;
        in response to receiving the call to the stub method, forwarding the call with the argument to the implementation method using the established link and passing the argument by reference, wherein the argument is received by the implementation method without the associated data type; and
        processing the forwarded call with the argument that was passed by reference using the implementation method.

2. The method of claim 1, wherein a single vector graphics application on the client computer executes the library file and the application file, and performs the operations.

3. The method of claim 2, wherein the single vector graphics application synchronously processes the implementation method and the stub method such that the single vector graphics application returns to the stub method after processing the directed call using the implementation method.

4. The method of claim 1, wherein the implementation method is part of a first object that is defined in the library file and wherein the stub method is part of a second object that is defined in the application file, wherein the link between the implementation method and the stub method is between the first object and the second object, and wherein executing the library file and the application file causes the client computer to perform operations further comprising:
    instantiating the first object as being associated with the first domain and instantiating the second object as being associated with the second domain, wherein the first object corresponds to the second object such that the second object refers to the first object for a full implementation.

5. The method of claim 4, wherein the first object further contains data and wherein the instructions of the implementation method provide access to the data, and the call made to the stub method seeks access to the data.

6. The method of claim 4, wherein the first object is associated with a data type and the second object is associated with the same data type as defined within the first domain and the second domain, respectively.

7. The method of claim 4, wherein the argument comprises a reference to an instantiated third object associated with the second domain, and wherein the third object is defined in the application file and corresponds to a fourth object defined in the library file.

8. The method of claim 7, wherein executing the library file and the application file causes the client computer to perform operations further comprising:
    resolving the argument to be an instantiation of the fourth object associated with the first domain and processing the directed call with the instantiated fourth object using the implementation method.

9. The method of claim 7, wherein executing the library file and the application file causes the client computer to perform operations further comprising:
    instantiating the fourth object as being associated with the first domain and processing the directed call with the instantiated fourth object using the implementation method.

10. The method of claim 1, wherein executing the library file and the application file causes the client computer to perform operations further comprising:
    instantiating a first object as being associated with the first domain, as part of processing the directed call using the implementation method, the first object being defined in the library file and containing at least a third method having instructions for processing the third method; in response to instantiating the first object, instantiating a second object as being associated with the second domain, the second object corresponding to the first object and containing at least a fourth method having instructions to direct calls to the third method.

11. The method of claim 1, wherein the call made to the stub method comprises a notification that an event associated with the second domain has occurred and the argument comprises information related to the event, wherein the stub method is designated as a handler for the event and the instructions of the implementation method process the event.

12. The method of claim 11, wherein the stub method overrides a predefined handler for the event.

13. The method of claim 1, further comprising:
sending by the first server hosted a scripting language file to the second server, the scripting language file defining the stub method, wherein the second server creates the application file by compiling the scripting language file.

14. A computer-implemented method comprising:
receiving at a first server corresponding to a first domain a request from a client computer for a library file that includes instructions that implement a implementation method that is associated with a first unique identifier; and
sending the library file to the client computer, the client computer having received an application file from a second server corresponding to a second domain, wherein the application file includes instructions that implement a stub method to direct calls to the implementation method, wherein the application file further includes an inherited method that inherits the implementation method and that includes instructions that modify at least a portion of the implementation method, wherein the stub method is associated with a second unique identifier, and wherein executing the library file and the application file causes the client computer to perform operations comprising:
associating the implementation method with the first domain and the stub method with the second domain so that the implementation method is restricted to receiving an argument from the stub method as data without an associated data type;
establishing a first link between the implementation method and the stub method using the first unique identifier and the second unique identifier, wherein the first link is used to forward calls made by code executed in association with the second domain from the stub method to the implementation method;
defining a stub of the inherited method to correspond to the inherited method, wherein the defined stub of the inherited method includes instructions to forward calls to the inherited method and is associated with the first domain, and wherein the inherited method is associated with the second domain such that the inherited method is restricted to receiving an argument from the stub of the inherited method as data without an associated data type; and
establishing a second link between the stub of the inherited method and the inherited method, wherein the second link is used to forward calls made by code executed in association with the first domain from the stub of the inherited method to the inherited method.

15. The method of claim 14, wherein executing the library file and the application file causes the client computer to perform operations further comprising:
directing a call made to the stub of the inherited method with an argument associated with a data type to the inherited method using the established second link, wherein the argument is received by the inherited method without the associated data type;
processing the directed call with the argument using the inherited method, wherein the inherited method is configured to treat the received argument as the associated data type, the inherited method invoking the stub method to process the directed call;
directing the call from the stub method to the implementation method using the established first link, wherein the argument is received by the implementation method without the associated data type; and
processing the directed call with the argument using the implementation method, wherein the implementation method is configured to treat the received argument as the associated data type.

16. A computer-implemented method comprising:
receiving at a client computer a vector graphics file from a third-party server;
receiving at the client computer a library file from a library server corresponding to a first internet domain, wherein the library file includes instructions that implement a implementation method that is associated with a first identifier, wherein the third-party server corresponds to a second internet domain, wherein the vector graphics file includes instructions that implement a stub method to direct calls to the implementation method, and wherein the stub method is associated with a second identifier;
associating the implementation method with the first domain and the stub method with the second domain so that the implementation method is restricted to receiving an argument from the stub method as data that does not have an associated data type;
establishing a link between the implementation method and the stub method using the first identifier and the second identifier;
receiving a call to the stub method made by code executed in association with the second domain, the call having an argument associated with a data type;
in response to receiving the call, forwarding the call with the argument to the implementation method using the established link and passing the argument by reference without change to the argument, wherein the argument is received by the implementation method without the associated data type; and
processing the forwarded call with the argument that was passed by reference using the implementation method, wherein the implementation method is configured to treat the received argument as the associated data type.

17. The method of claim 16, wherein the implementation method is part of a first object that is defined in the vector graphics file and wherein the stub method is part of a second object that is defined in the library file, the method further comprising:
instantiating the first object as being associated with the first domain and instantiating the second object as being associated with the second domain, wherein the first object corresponds to the second object such that the second object is refers to the first object for a full implementation.

18. The method of claim 16, wherein the implementation method and the stub method are processed synchronously such that processing returns to the stub method after the directed call is processed using the implementation method.

19. A system for performing cross-domain linking of data types, the system comprising:
one or more servers corresponding to a first internet domain;

means for creating a library file that includes instructions that implement a implementation method that is associated with a first unique identifier and a development library file that includes instructions that implement a stub method to direct calls to the implementation method, wherein the implementation method is associated with a second unique identifier;

an interface to the one or more servers configured to receive a first request from a third-party server for the development library file to be compiled into a vector graphics file and configured to receive a second request from the client computer for the library file; and a communication module to transmit the development library file to the third-party server and to transmit the library file to the client computer, wherein the development library file is configured to establish a link between the implementation method and the stub method so that a call with an argument made to the stub method is directed to the implementation method with the argument being passed by reference when the vector graphics file and the library file are executed by the application on the client computer.

20. The system of claim 19, further comprising:

one or more second servers representing the third-party server and corresponding to a second internet domain; and a processing device representing the client computer that is capable of executing the application, and that is capable of executing the vector graphics file and the library file using the application.

* * * * *